(12) United States Patent
Brown

(10) Patent No.: US 12,470,082 B1
(45) Date of Patent: Nov. 11, 2025

(54) POWER SYSTEM

(71) Applicant: Audley Brown, Miami, FL (US)

(72) Inventor: Audley Brown, Miami, FL (US)

( * ) Notice: Subject to any disclaimer, the term of this patent is extended or adjusted under 35 U.S.C. 154(b) by 17 days.

(21) Appl. No.: 18/450,209

(22) Filed: Aug. 15, 2023

Related U.S. Application Data

(60) Provisional application No. 63/398,256, filed on Aug. 16, 2022.

(51) Int. Cl.
*H02J 7/35* (2006.01)
*H02J 7/00* (2006.01)
*H05K 7/02* (2006.01)
*F04D 25/06* (2006.01)

(52) U.S. Cl.
CPC .............. *H02J 7/35* (2013.01); *H02J 7/0013* (2013.01); *H05K 7/02* (2013.01); *F04D 25/0673* (2013.01)

(58) Field of Classification Search
CPC .. H02J 7/35; H02J 7/0013; H05K 7/02; F04D 25/0673
See application file for complete search history.

(56) References Cited

U.S. PATENT DOCUMENTS

| | | | |
|---|---|---|---|
| 4,595,841 A | 6/1986 | Yaguchi | |
| 4,902,955 A | 2/1990 | Manis et al. | |
| D309,892 S | 8/1990 | Troup | |
| 5,162,662 A | 11/1992 | Nakayama | |
| 5,212,952 A | 5/1993 | Yokoyama et al. | |
| 5,444,592 A | 8/1995 | Shimizu et al. | |
| 5,998,961 A | 12/1999 | Brown | |
| 8,076,900 B1* | 12/2011 | Brown | H02J 7/0042 320/105 |
| 8,759,714 B2* | 6/2014 | Fosbinder | B23K 9/10 219/133 |
| 10,135,271 B2 | 11/2018 | Miller | |
| 11,342,780 B1 | 5/2022 | Brown | |
| 11,523,488 B1* | 12/2022 | Recker | H05B 47/105 |
| 2006/0119104 A1* | 6/2006 | Wall | H02J 7/32 290/2 |
| 2008/0210289 A1* | 9/2008 | Chen | H02S 30/20 136/244 |
| 2009/0230783 A1* | 9/2009 | Weed | H02J 7/35 307/150 |

(Continued)

*Primary Examiner* — Daniel Kessie
*Assistant Examiner* — Brian K Baxter
(74) *Attorney, Agent, or Firm* — Albert Bordas, Esq.

(57) ABSTRACT

The power having a frame, a main power base mounted on the frame, a battery package removably mounted on the main power base and electrically coupled with the main power base, a flashlight removably mounted on the battery package and electrically coupled with the battery package, a solar panel electrically coupled with the main power base and the battery package, and a remote control wirelessly connected with the main power base, the battery package and the solar panel. The power system has a base assembly, a head assembly, an electrical system, an electrical assembly, a solar panel and a remote control, the electrical assembly is housed within the base assembly, the electrical system is housed within the head assembly, the solar panel is electrically coupled with the electrical system and the electrical assembly, the remote control is wirelessly connected with the electrical assembly, the electrical system and the solar panel.

1 Claim, 8 Drawing Sheets

(56) References Cited

U.S. PATENT DOCUMENTS

| | | | |
|---|---|---|---|
| 2011/0156634 A1* | 6/2011 | Lai | H02J 7/35 |
| | | | 320/101 |
| 2012/0242277 A1* | 9/2012 | Flemming | H02J 7/0042 |
| | | | 320/104 |
| 2015/0162814 A1* | 6/2015 | Davis | B60L 53/24 |
| | | | 307/65 |
| 2015/0171632 A1* | 6/2015 | Fry | H02J 7/0047 |
| | | | 307/22 |
| 2015/0267882 A1* | 9/2015 | O'Brien | F21V 23/0442 |
| | | | 362/183 |
| 2016/0301354 A1* | 10/2016 | Draffin, II | H02S 40/38 |
| 2017/0047878 A1* | 2/2017 | Hall | H02K 53/00 |
| 2019/0373999 A1* | 12/2019 | Nauertz | A45C 15/00 |
| 2020/0091724 A1* | 3/2020 | Freni | G06F 1/16 |
| 2020/0220490 A1* | 7/2020 | Wilson | H01M 50/251 |
| 2022/0109321 A1* | 4/2022 | Truettner | H02J 7/0042 |
| 2023/0118705 A1* | 4/2023 | Wenzlick | H02J 7/0047 |
| | | | 320/107 |
| 2023/0204203 A1* | 6/2023 | Muelling | H02J 7/0045 |
| | | | 362/154 |
| 2024/0006903 A1* | 1/2024 | Sharp | H05B 47/11 |
| 2024/0170996 A1* | 5/2024 | Mouchet | B60L 53/60 |

\* cited by examiner

POWER SYSTEM

RELATED APPLICATIONS

The present application claims priority of pending U.S. Provisional Application No. 63/398,256, filed on Aug. 16, 2022, which is hereby incorporated by reference.

BACKGROUND OF THE INVENTION

The present invention relates generally to a power system, and more particularly, to a portable multi-purpose power generator/battery supply system that can be charged using solar power.

PRIOR ART

Applicant believes that one of the closest references corresponds to his own U.S. Pat. No. 5,998,961 issued on Dec. 7, 1999 for a portable battery charger. However, it differs from the present invention because in that invention, Brown teaches a portable battery charger for jump-starting an engine of a disabled vehicle including a main housing having a motor and a generator disposed therein. The main housing includes gasoline and oil intake portions in communication with the motor. A pair of cables extends outwardly from one of the sidewalls of the main housing. The pair of cables is in communication with the generator. The pair of cables each has a spring-loaded clip disposed on free ends thereof for operative coupling with positive and negative terminals of a battery.

Applicant believes that one of the closest references corresponds to his own U.S. patent application Ser. No. 11/342,780 issued on May 24, 2022 for a portable hybrid generator. However, it differs from the present invention because in that invention, Brown teaches a portable hybrid generator having a frame assembly with a battery-mounting base, a gas power charger assembly secured within the frame assembly, and an electric charger assembly mounted onto the battery-mounting base. The frame assembly has a front wall, frames, lateral walls, a rear wall, a top edge, a dividing wall, and a cover. The lateral walls extend from the battery-mounting base to the top edge and have battery connection points. The frame assembly further has wheels, a stopper, and a handle. The front wall has a transfer switch, a motor on/off switch, and at least one frame outlet. The gas power charger assembly has a gas motor, an alternator, a gas tank, and a solenoid. The electric charger assembly has first and second portable battery assemblies.

Applicant believes that another reference corresponds to U.S. Pat. No. U.S. Pat. No. 10,135,271 B2 issued to Miller on Nov. 20, 2018 for a multi-functional portable power charger. However, it differs from the present invention because Miller teaches a portable charger capable of jump starting a 12 V car battery which includes a charger battery, a jump start circuit operatively electrically connected with the charger battery and with an ignition power outlet, and a microcontroller for coordinating safety functions to establish or interrupt the operative electrical connection of the jump start circuit with the ignition power outlet. The ignition power outlet comprises a positive power socket, a negative power socket, a positive sensing socket and a negative sensing socket. The sensing sockets are electrically isolated from the power sockets, and the microcontroller senses voltage across the sensing sockets and is configured to interrupt the operative electrical connection of the jump start circuit to the ignition power outlet until proper voltage is sensed across the sensing sockets.

Applicant believes that another reference corresponds to U.S. Pat. No. 5,212,952 issued to Yokoyama, et al. on May 25, 1993 for a compact power supply and lubricant-affording device therefore. However, it differs from the present invention because Yokoyama, et al. teach a compact portable electrical generator powered by a gas fueled internal combustion engine. A combined starter and generator are coupled to the engine for starting of the engine and for generating electrical power when the engine is running. The engine includes a lubricating system including lubricant that is supplied from a separately insertable lubricant cartridge and which is pumped by a hose compressing type of pump so as to insure adequate delivery of small amounts of lubricant regardless of the orientation of the unit and also so as to insure that lubricant cannot leak from the system when the unit is not being operated.

Applicant believes that another reference corresponds to U.S. Pat. No. 5,162,662, issued to Nakayama on Nov. 10, 1992 for a compact power supply with gas engine. However, it differs from the present invention because Nakayama teaches a compact portable power supply including an internal combustion engine that drives a generator and which engine is fueled by a pressurized source of gaseous fuel. The outer housing and control structure is configured in such a way that the source of gaseous fuel will always be oriented so that liquid fuel will not be delivered to the engine when the power supply is in use.

Applicant believes that another reference corresponds to U.S. Pat. No. 4,595,841, issued to Yaguchi on Jun. 17, 1986 for a full-covered portable generator. However, it differs from the present invention because Yaguchi teaches a full-covered portable generator composed of a generator core, an engine for driving the generator core enclosed by a cover comprising discrete front, rear and bottom cover elements. The rear cover element is detachably joined to the rear cover element along lateral peripheral surfaces of the generator. The engine and its main components are each covered at least in part by the front cover element in a manner that they are exposed when the rear cover element is detached from the front cover element, for facilitation of the maintenance thereof. Various controls and readouts or displays are arranged on the front cover element transversely of the generator, preferably in an order corresponding to the required order in which they are operated or read. A carrying handle is arranged on an upper surface of the front cover element and extends transversely of the generator.

Applicant believes that another reference corresponds to U.S. Pat. No. D309892 issued to Troup on Aug. 14, 1990 for a portable generator for charging automobile batteries.

Applicant believes that another reference corresponds to U.S. Pat. No. 4,902,955, issued to Manis, et al. on Feb. 20, 1990 for a portable battery charger. However, it differs from the present invention because Manis, et al. teach an improved portable battery charger (10) for boosting and charging automotive-type batteries. The battery charger (10) comprises rectifier means (34), an automotive-type battery (20), and an air compressor (24) powered by the battery (20) received within a charger housing (12). Positive and negative charging cables (30) and (28), respectively are retractably received within first and second cable housings (14) and (16), respectively. The first and second cable housings are positioned adjacent oppositely disposed external walls of the charger housing (12) and are dimensioned such that the positive and negative charging clamps (76) and (70), respectively may be slidably positioned over saddle notches (72) defined by the cable housings when the charging cables are fully retracted into the cable housings whereby the charging clamps (76) and (70) are physically isolated from each other by the charger housing (12), thereby preventing accidental contact between the clamps.

Applicant believes that another reference corresponds to U.S. Pat. No. 5,444,592, issued to Shimizu, et al. on Aug. 22, 1995 for a portable power unit. However, it differs from the present invention because Shimizu, et al. teach a portable power unit that has a protective circuit for cutting off an output current from the power unit when the power unit is in an overload state. An amount of the output current is detected. An output voltage from the power unit is reduced when the amount of the output current detected reaches a first threshold value, thereby preventing the protective circuit from undesirably operating for one power unit when it is connected for another for parallel operation. When the amount of the output current decreases to a second threshold value, which is smaller than the first threshold value, with the power unit being in a state in which the output voltage is reduced, the voltage-reducing operation is canceled.

Other patents describing the closest subject matter provide for a number of more or less complicated features that fail to solve the problem in an efficient and economical way. None of these patents suggest the novel features of the present invention.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention is directed to a power system. In a first embodiment, the power system comprises a frame, a main power base mounted on the frame, a battery package removably mounted on the main power base and electrically coupled with the main power base, a flashlight removably mounted on the battery package and electrically coupled with the battery package, a solar panel electrically coupled with the main power base and the battery package, and a remote control wirelessly connected with the main power base, the battery package, and the solar panel.

A retractable handle telescopically connects with and extends from the frame, and wheels rotatably connect with the frame.

The main power base comprises on its top surface a voltage meter, a cable booster port, a storage component, a screen, a power button, and a hinge door. The main power base comprises on its rear surface a power input panel including a 3-prong port, a cigarette lighter port, a power adapter port, a hinge cover, and an air compressor adapter, The main power base comprises heat vents on the lateral surfaces.

The battery package comprises on its front surface a power output panel including a 3-prong port(s), cigarette lighter ports, power adapter ports, a hinge cover, a screen, and a power button. The battery package further comprises a cable booster port located on its top surface and retractable multimeter prongs located on its rear surface.

The flashlight comprises high/medium/low brightness settings and is charged by the battery package, the flashlight is located on a front surface of the battery package.

The solar panel supplies power to the main power base and the battery package at the same time.

In a second embodiment, the power system comprises a base assembly, a head assembly removably mounted onto the base assembly, an electrical assembly housed within the base assembly, an air compressor system housed within the base assembly, an electrical system housed within the head assembly, a solar panel electrically coupled with the electrical system and the electrical assembly, and a remote control wirelessly connected with the electrical assembly, the electrical system, and the solar panel.

The base assembly comprises a base wall, sidewalls, a front wall, a rear wall having T-hangers, a first edge, and wheels, the front wall, the rear wall, and the sidewall comprise vents.

The electrical assembly comprises a first rechargeable battery, a first buck converter electrically coupled with the rechargeable battery, a first booster cable port, a first cigarette lighter socket, and a first port. The first booster cable port removably receives a booster cable assembly having a positive clamp and a negative clamp for operative coupling with positive and negative terminals of a battery.

The electrical assembly further comprises a fan assembly, a battery voltmeter, a switch, a reverse polarity sensor, a switch, and an indicator.

The air compressor system comprises an air compressor, whereby compressed air is delivered through a hose outlet and a hose to a valve stem fitting.

The head assembly comprises an edge, sidewalls, a front wall, and a rear wall having T-hangers. The head assembly comprises a handle assembly, whereby the handle assembly is telescopic and extends from the head assembly.

The electrical system comprises a second rechargeable battery, a second buck converter electrically coupled with the second rechargeable battery, a second booster cable port, a second cigarette lighter socket, a second port, and a reverse polarity sensor, whereby the second rechargeable battery makes electrical contact with the first rechargeable battery when the head assembly is mounted onto the base assembly, whereby contact posts are mounted to the first rechargeable battery and electrically connected thereto with electrical wires.

The electrical system further comprises a third rechargeable battery which powers a light-emitting diode and a switch to operate the light-emitting diode located on the head assembly.

The solar panel supply power to the first and second rechargeable batteries at the same time using an inverter connected to the first or second rechargeable batteries.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various s feature combinations and sub-combinations described in the detailed description.

These and other objects, features, and advantages of the present invention will become more readily apparent from the attached drawings and the detailed description of the preferred embodiments, which follow.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

The preferred embodiments of the invention will hereinafter be described in conjunction with the appended drawings provided to illustrate and not to limit the invention, where like designations denote like elements, and in which:

FIG. 1 is a perspective view of a power system, according to a first embodiment of the present invention.

FIG. 2 is another perspective view of a power system, according to a first embodiment of the present invention.

FIG. 3 is a top view of a power system, according to a first embodiment of the present invention.

FIG. 4 is a front view of a power system, according to a first embodiment of the present invention.

FIG. 5 is an exploded view of a power system, according to a first embodiment of the present invention.

FIG. 6 is a left-side elevation view of the instant invention, which has been partially cross-sectioned to show an interior section, according to a second embodiment of the present invention.

FIG. 7 is a right-side elevation view of the instant invention, according to a second embodiment of the present invention.

FIG. 8 is a top plan view of a head assembly of the present invention, according to a second embodiment of the present invention.

FIG. 9 is a top plan view of a base assembly of the present invention, according to a second embodiment of the present invention.

Like reference numerals refer to like parts throughout the several views of the drawings.

DETAILED DESCRIPTION OF THE INVENTION

Figure 1:
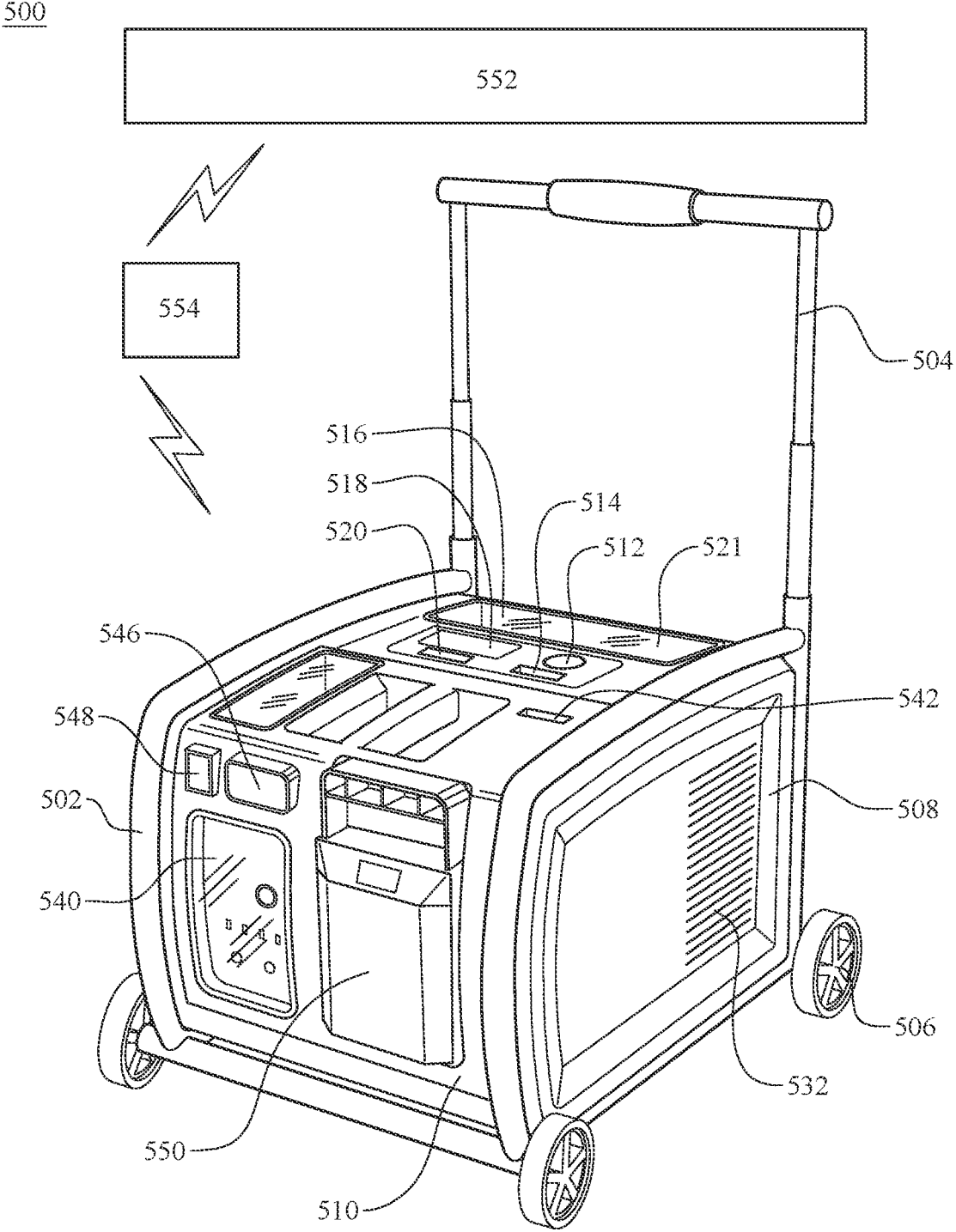
Figure 2:
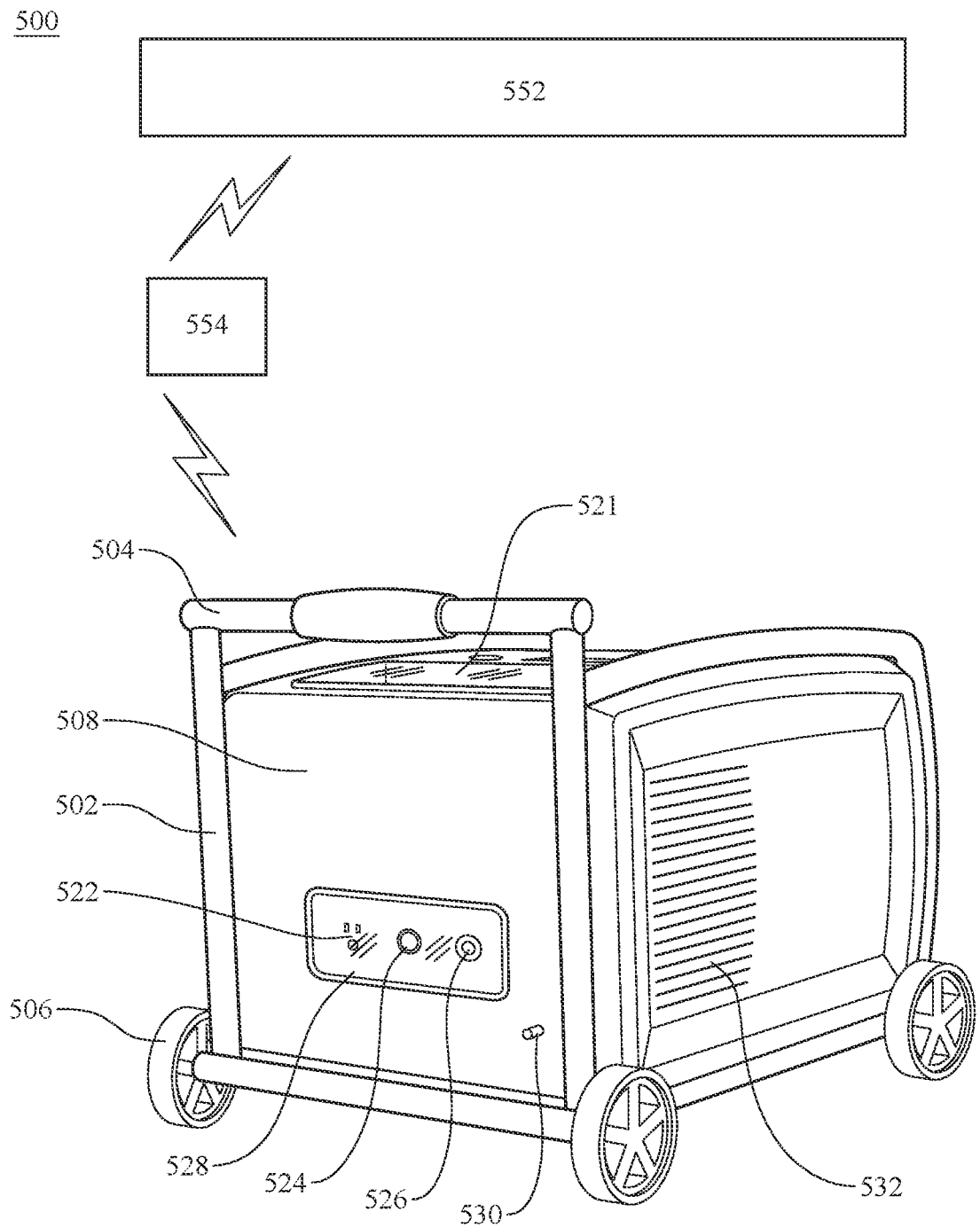
Figure 3:
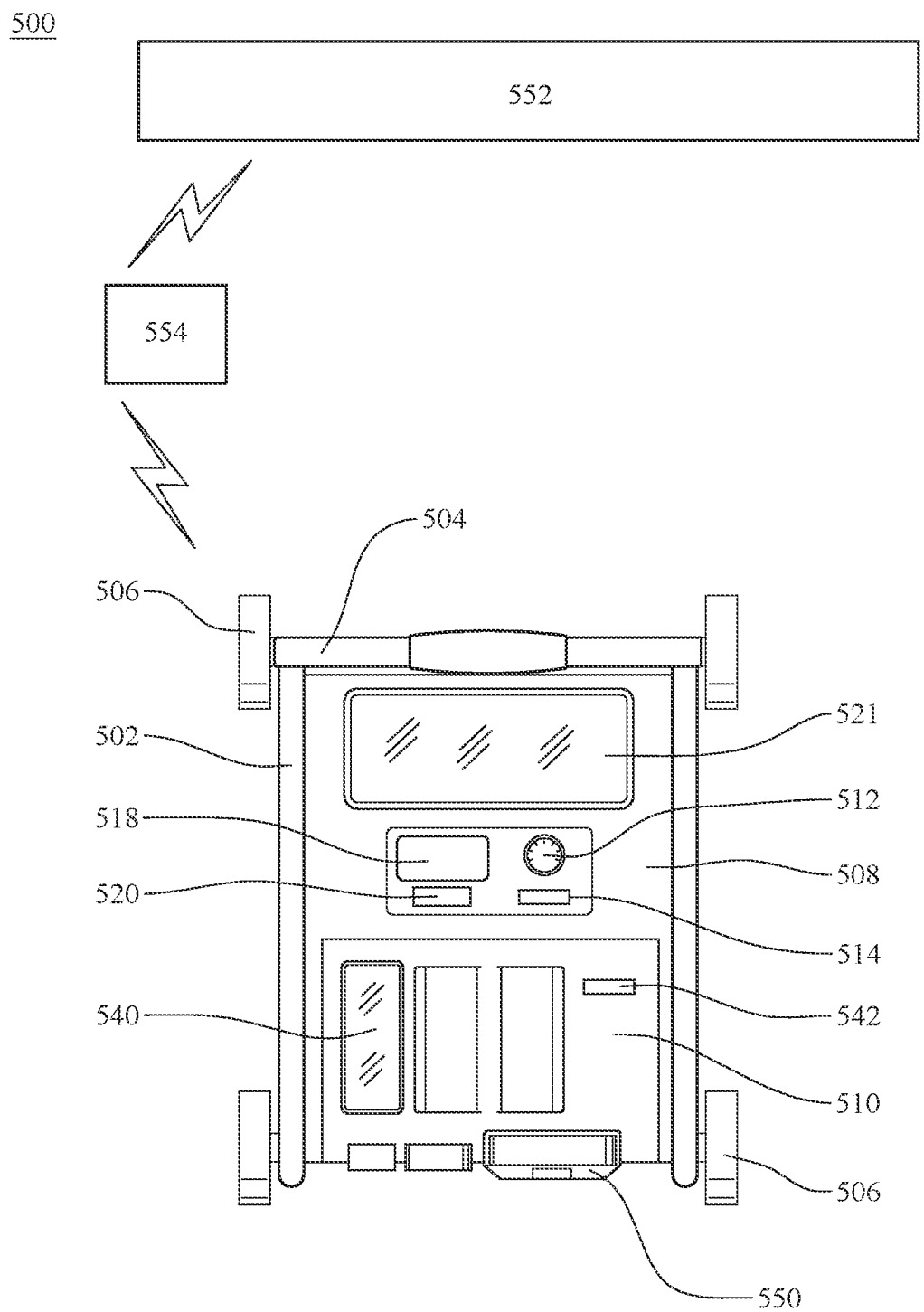
Figure 4:
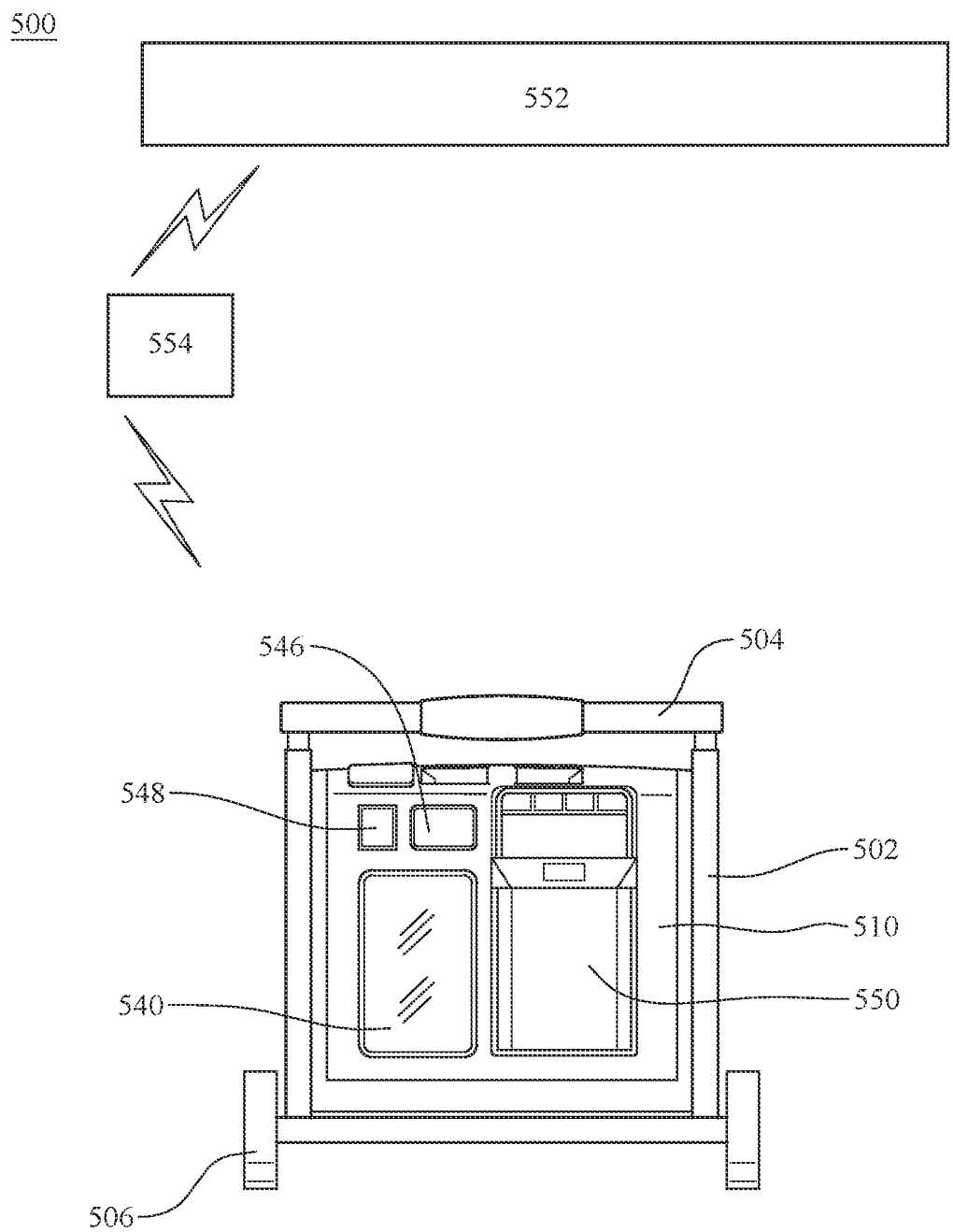
Figure 5:
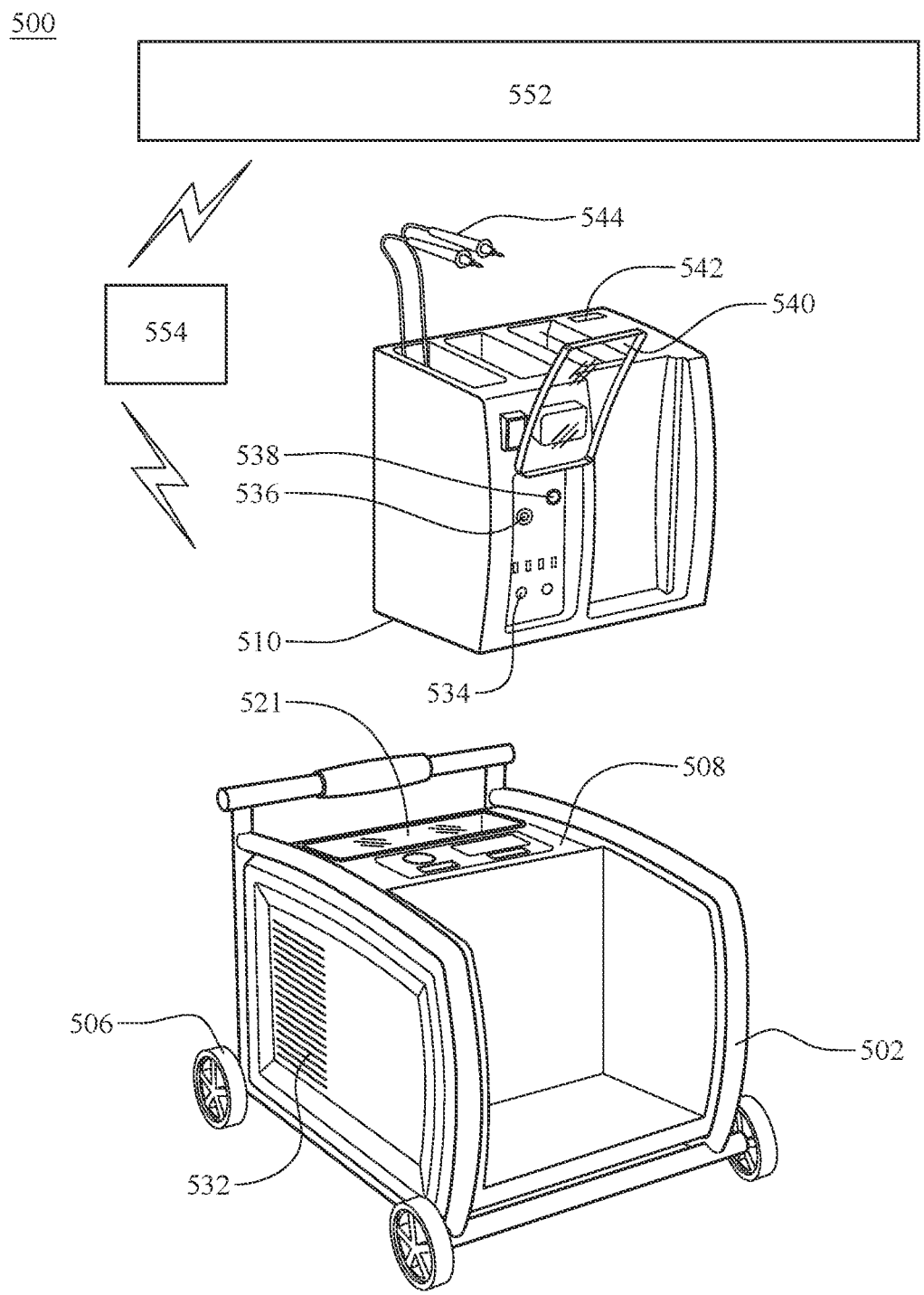
Figure 6:
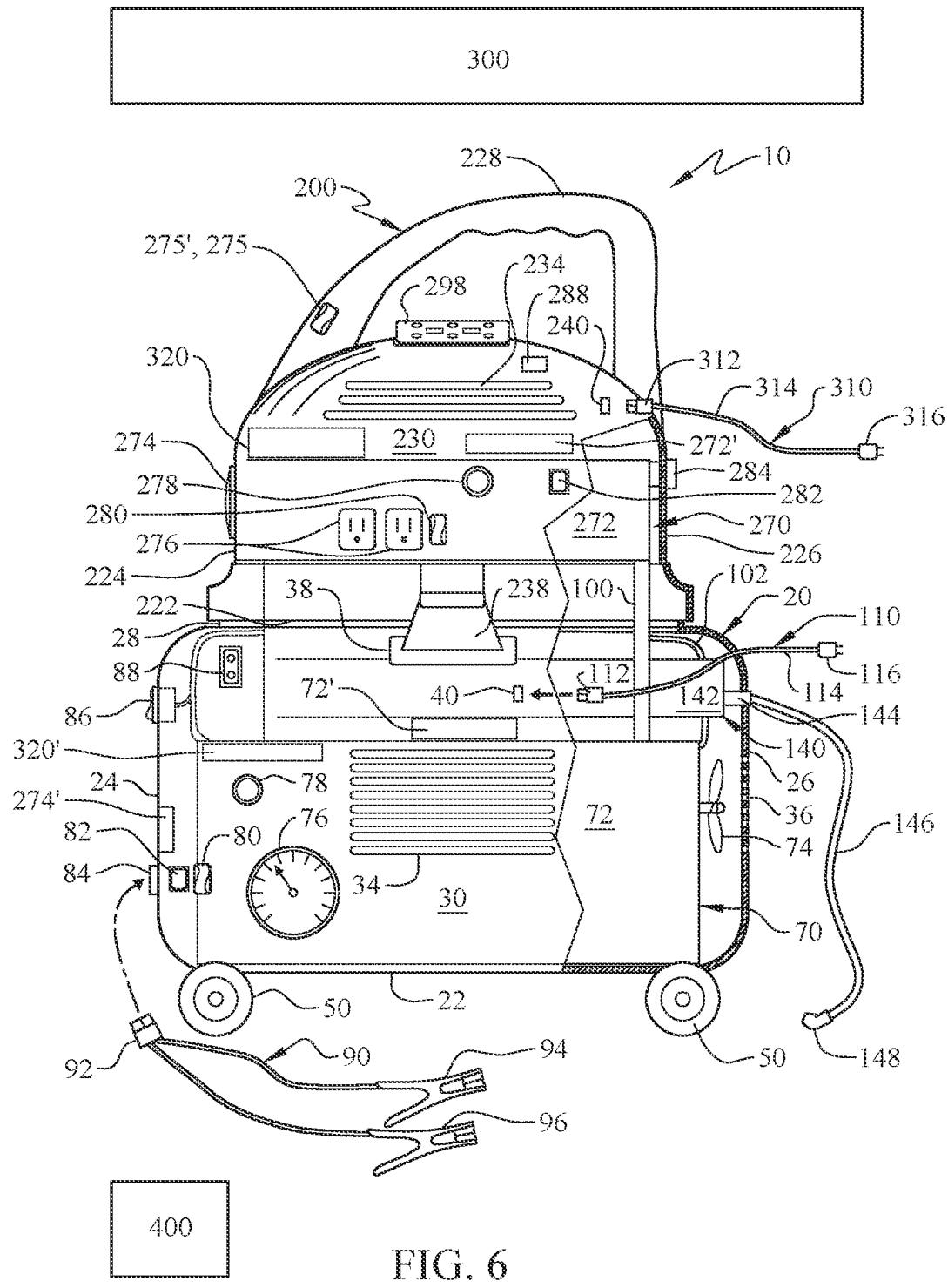
Figure 7:
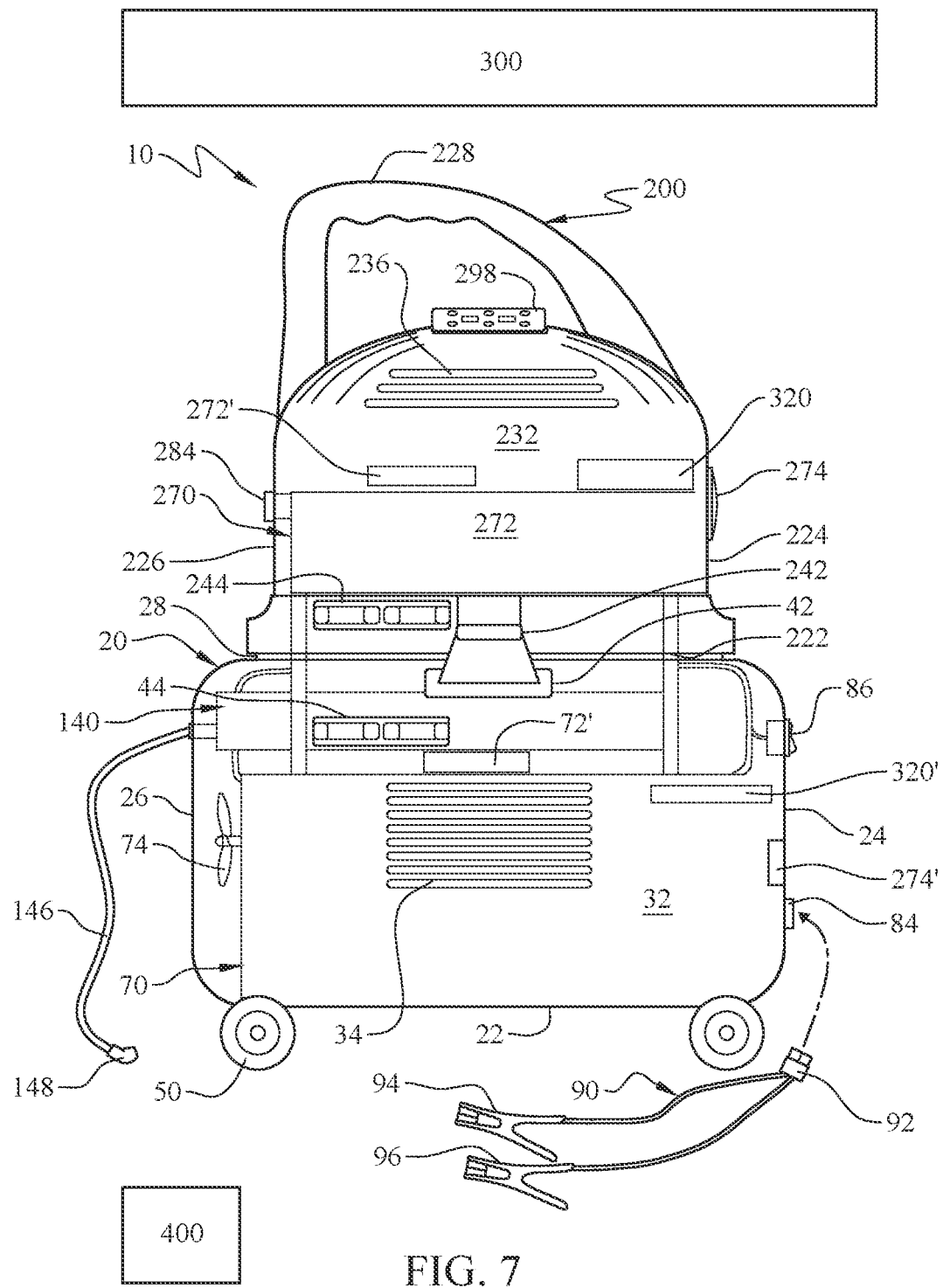
Figure 8:
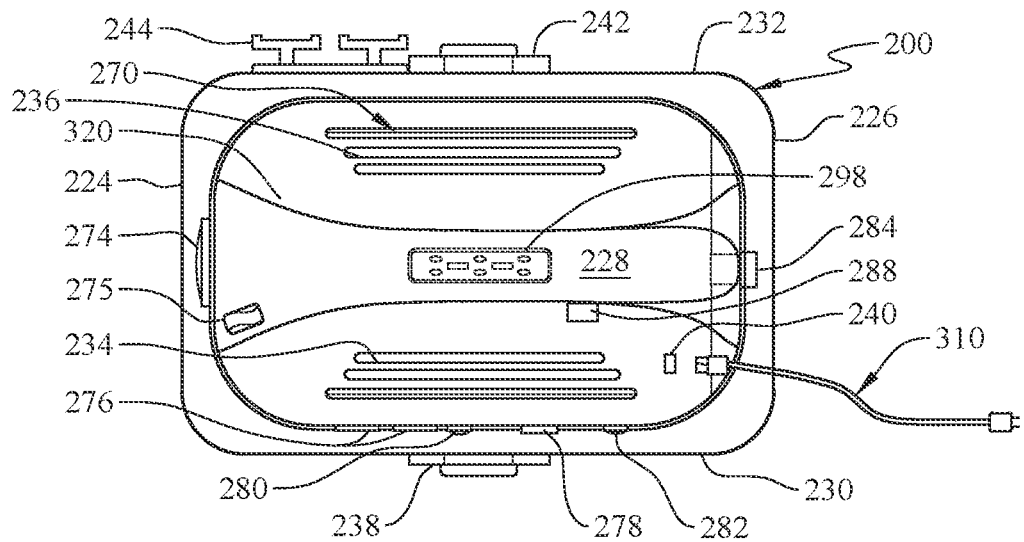
Figure 9:
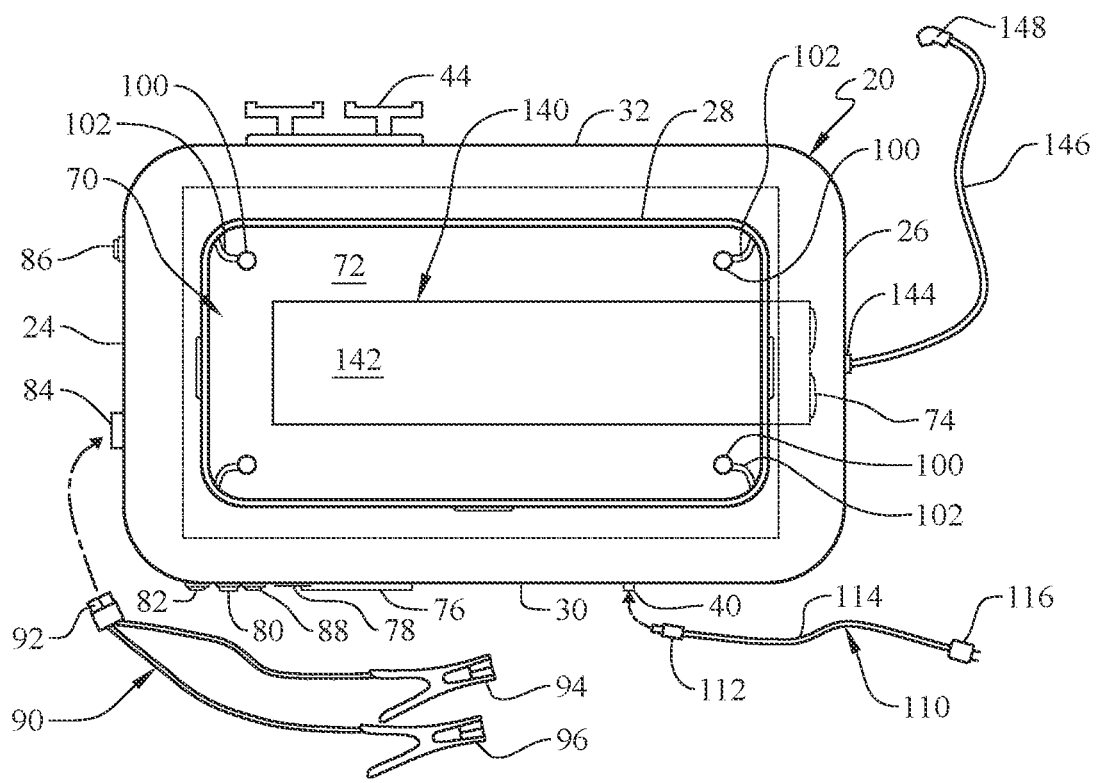

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

FIRST EMBODIMENT

A power system 500 which is a portable multi-purpose power generator/battery supply system that can be charged using solar power.

The power system 500 comprises a frame 502, a retractable handle 504 for easy transport telescopically connected with and extending from the frame 502, wheels 506 rotatably connected with the frame 502 for easy transport, a main power base 508 permanently or removably mounted on the frame 502, and a battery package 510 removably mounted on the main power base 508 and electrically coupled with the main power base 508.

The main power base 508 features charging docking for the battery package 510 while the battery package 510 can be charged by the main power base 508.

To save energy, the main power base 508 and the battery package 510 are two separate and distinct circuits that function independently-one for, e.g., 4V and another for, e.g., 12 V.

The main power base 508 comprises a voltage meter 512, a cable booster port (jumper cable port) 514, a storage component 516 which is an extra storage component for folding cables, a screen 518, and a power button 520. The main power base 508 further comprises a hinge door 521 for covering the storage component 516. The main power base 508 further comprises a main control panel including the voltage meter 512, the cable booster port 514, the screen 518, and the power button 520. These components might be located on a top surface of the main power base 508.

The main power base 508 further comprises a power input panel including a 3-prong port 522, a cigarette lighter port 524, a power adapter port 526, and a hinge cover 528 for covering the 3-prong port 522, the cigarette lighter port 524, and the power adapter port 526. The main power base 508 further comprises an air compressor adapter 530. These components might be located on a rear surface of the main power base 508.

The main power base 508 further comprises heat vents 532 that might be located on lateral surfaces of the main power base 508.

The battery package 510 comprises a power output panel including a 3-prong port(s) 534, a cigarette lighter port(s) 536, a power adapter port(s) 538, and a hinge cover 540 for covering the 3-prong port 534, the cigarette lighter port 536, and the power adapter port 538. The battery package 510 further comprises a screen 546 and a power button 548. These components might be located on a front surface of the battery package 510.

The battery package 510 further comprises a cable booster port (jumper cable port) 542 that might be located on a top surface of the battery package 510.

The battery package 510 further comprises a retractable multimeter prong(s) 544 that might be located on a rear surface of the battery package 510.

The cable booster port 514 and cable booster port 542 each removably receives a booster cable assembly which has a plug, a positive clamp and a negative clamp.

The power system 500 further comprises a removable rechargeable flashlight 550 with its own built-in circuit (4 V circuit).

The flashlight 550 is removably mounted on the battery package 510 and electrically coupled with the battery package 510, such that the flashlight 550 is charged by the battery package 510. The flashlight 550 has high/medium/low brightness settings. The flashlight 550 might be located on a front surface of the battery package 510.

The power system 500 further comprises a solar panel 552. The solar panel 552 is electrically coupled with the main power base 508 and the battery package 510. The solar panel 552 can supply power to the main power base 508 and the battery package 510 at the same time using an inverter (duo battery solar inverter from EP Solar). The solar panel 552 can be placed remotely by way of an extension cordage, one or more of the outlets can be pulled and provided in a remote location (e.g., another room or area) without having to move the power system 500. The solar panel 552 maximizes the life of the main power base 508 and the battery package 510. This is an improvement. This updated version is significantly more efficient.

The power system 500 further comprises a remote control 554. The remote control 554 is wirelessly connected with the main power base 508 and the battery package 510, and the solar panel 552. The remote control 554 has Wi-Fi control capability to the main power base 508 and the battery package 510, and the solar panel 552.

The power system 500 can power a house or car in case of a power outage. In the power system 500, the power sources need to be swapped in order to switch back and forth.

The power system 500 can vary in size to give power for different periods of time and how many devices one can plug into it.

SECOND EMBODIMENT

Referring now to the drawings, the present invention is generally referred to a power system 10 which is a portable multi-purpose power generator/battery supply system that can be charged using solar power. It can be observed that the power system 10 basically includes a base assembly 20, an electrical assembly 70, an air compressor system 140, a head assembly 200, and an electrical system 270.

To save energy, the electrical assembly 70 and the electrical system 270 are two separate and distinct circuits that function independently-one for, e.g., 4V and another for, e.g., 12 V.

The base assembly 20 comprises a base wall 22, sidewalls 24 and 26, a front wall 30, a rear wall 32, and an edge 28. The front wall 30 and the rear wall 32 comprise vents 34 for ventilation of the electrical assembly 70 and the air compressor system 140. The sidewall 26 comprises vents 36 for additional ventilation of the electrical assembly 70 and the air compressor system 140. The base assembly 20 further comprises wheels 50 for easy transport.

The base assembly 20 has extra storage components and space to fold cables. The base assembly 20 houses the electrical assembly 70. The electrical assembly 70 comprises a rechargeable battery 72 and a buck converter 72' electrically coupled with the rechargeable battery 72. The electrical assembly 70 further comprises a booster cable port 84, a cigarette lighter socket 78, and a port 40. The booster cable port 84 removably receives a booster cable assembly 90. The booster cable assembly 90 comprises a plug 92 that is of a cooperative shape and dimension to insert into the booster cable port 84. The booster cable assembly 90 also comprises a positive clamp 94 and a negative clamp 96 for operative coupling with positive and negative terminals of a battery such as that of a vehicle.

The cigarette lighter socket 78 serves as one form of recharging means for the rechargeable battery 72, whereby a two-ended cigarette lighter plug cable, not seen, can be connected from the cigarette lighter socket 78 to the vehicle's cigarette lighter. Similarly, in the event of an emergency or foul weather, from within the vehicle the two-ended cigarette lighter plug cable can be connected from the cigarette lighter socket 78 to the vehicle's cigarette lighter to recharge the vehicle's battery. On the other hand, the power system 10 can be recharged by using the cigarette lighter socket 78 and vehicle's power or battery. In addition, the port 40 receives an accessory power cord 110 as another form of recharging means for the rechargeable battery 72, whereby power may be fed from an AC power source. The accessory power cord 110 comprises a plug 112, a cable 114 and a plug 116.

The electrical assembly 70 further comprises a fan assembly 74, a battery voltmeter 76, a switch 80, a reverse polarity sensor 82, a switch 86 and an indicator 88. The fan assembly 74 operates whenever the rechargeable battery 72 is operating. The fan assembly 74 removes hot air produced from within the base assembly 20 and expels is through vents 34 and 36. The voltmeter 76 measures an electrical potential difference between two points in an electric circuit. The switch 80 is an "on/off" switch to operate the rechargeable battery 72. The reverse polarity sensor 82 checks for reversed polarity when the booster cable assembly 90 is utilized, and specifically the placement of the positive clamp 94 and the negative clamp 96. The switch 86 is an "on/off" switch to power the rechargeable battery 72 or a rechargeable battery 272 when the head assembly 200 is mounted onto the base assembly 20. The indicator 88 illuminates when the rechargeable battery 272 makes electrical contact with the rechargeable battery 72 when the head assembly 200 is mounted onto the base assembly 20, whereby contact posts (prong connections) 100 are mounted to the rechargeable battery 72 and electrically connected thereto with electrical wires 102.

The base assembly 20 also houses the air compressor system 140. The air compressor system 140 comprises an air compressor (air pump) 142 and means to deliver compressed air through a hose outlet 144 and a hose 146 to a valve stem fitting 148. The air compressor 142 is powered by either solar power or battery power.

The head assembly 200 is removably mounted onto the base assembly 20. The head assembly 200 is detachable from the base assembly 20 via four prong connections. The head assembly 200 comprises an edge 222 of cooperative dimensions and shape to snugly mount around an edge 28 of the base assembly 20. The head assembly 200 comprises sidewalls 124 and 126, a front wall 230, and a rear wall 232. A handle assembly 228 for easy transport extends from the head assembly 200. The handle assembly 228 may be telescopic. Locking members 238 and 242 are disposed at the front and rear walls 30 and 32 respectively, and at a cooperative disposition to engage apertures 38 and 42 of the base assembly 20.

The head assembly 200 has extra storage components and space to fold cables. The head assembly 200 houses the electrical system 270. The electrical system 270 comprises the rechargeable battery 272 and a buck converter 272' electrically coupled with the rechargeable battery 272. The electrical system 270 further comprises a booster cable port 284, a cigarette lighter socket 278, and a port 240. The booster cable port 284 removably receives the booster cable assembly 90. A reverse polarity sensor 282 checks for reversed polarity when the booster cable assembly 90 is utilized, and specifically the placement of the positive clamp 94 and the negative clamp 96.

Electrical outlets 276 serve as one form of recharging means for the rechargeable battery 272, whereby power may be fed from a power source via an electrical cord, not seen. A switch 280 is an "on/off" switch to operate the electrical outlets 276. An automatic reset fuse 288 is activated in the event that there is excess current to the electrical outlets 276. The cigarette lighter socket 278 serves as another form of recharging means for the rechargeable battery 272, whereby the two-ended cigarette lighter plug cable, not seen, can be connected from the cigarette lighter socket 278 to the vehicle's cigarette lighter. Similarly, in the event of an emergency or foul weather, from within the vehicle the two-ended cigarette lighter plug cable can be connected from the cigarette lighter socket 278 to the vehicle's cigarette lighter to recharge the vehicle's battery. On the other hand, the power system 10 can be recharged by using the cigarette lighter socket 278 and vehicle's power or battery. In addition, the port 240 receives an accessory power cord 310 as yet another form of recharging means for the rechargeable battery 272, whereby power may be fed from an AC power source. The accessory power cord 310 comprises a plug 312, a cable 314 and a plug 316. A voltage tester 298 can help determine whether there is current flowing through a wire and test for grounding.

For example, one of the cigarette lighter socket 78 and the cigarette lighter socket 278 is for solar connection only while the other is for grid connection only.

The rechargeable battery 272 makes electrical contact with the rechargeable battery 72 when the head assembly 200 is mounted onto the base assembly 20, whereby the contact posts (prong connections) 100 are mounted to the rechargeable battery 72 and electrically connected thereto with the electrical wires 102. In a preferred embodiment, four contact posts (four prong connections) 100 are mounted next to upper corners of the rechargeable battery 72. The contact posts (prong connections) 100 make the electrical contact with the rechargeable battery 72.

For example, one of the rechargeable battery 72 and the rechargeable battery 272 is for solar connection only while the other is for grid connection only.

The electrical system 270 further comprises a rechargeable battery 320. The rechargeable battery 320 powers illuminating means fixed upon the head assembly 200. The illuminating means can be a light-emitting diode 274. A switch 275 is an "on/off" switch to operate the light-emitting diode 274. Additionally or alternatively, the electrical assembly 70 further comprises a rechargeable battery 320' and illuminating means fixed upon the base assembly 20 and powered by the rechargeable battery 320'; a switch 275' is an "on/off" switch to operate the illuminating means; the illuminating means may be a light-emitting diode 274'. For example, the light-emitting diode 274 or 274' may be a removable rechargeable flashlight with its own built-in circuit (4 V circuit).

T-hangers 44 are mounted to the rear wall 32, and T-hangers 244 are mounted to the rear wall 232. The T-hangers 44 and 244 may be used to coil or suspend the booster cable assembly 90 therefrom.

The front wall 30 and the rear wall 32 comprise the apertures 38 and 42 respectively at a predetermined distance from the edge 28. In addition, as best seen in this illustration, the front wall 230 has vents 234, and rear wall 232 has vents 236.

The base assembly 20 comprises the edge 28 defining an opening for the base assembly 20. In addition, as best seen in this illustration, the contact posts (prong connections) 100 are mounted to the rechargeable battery 72 and electrically connected thereto with the electrical wires 102. As described above, in the preferred embodiment, four contact posts (four prong connections) 100 are mounted next to upper corners of the rechargeable battery 72 and the contact posts (prong connections) 100 make the electrical contact with the rechargeable battery 72.

The power system 10 further comprises a solar panel 300. The solar panel 300 is electrically coupled with the electrical system 270 and the electrical assembly 70. The solar panel 300 is electrically coupled with the rechargeable battery 72 and the rechargeable battery 272. The solar panel 300 can supply power to the rechargeable battery 72 and the rechargeable battery 272 at the same time using an inverter (duo battery solar inverter from EP Solar) that is connected to the rechargeable battery 72 or the rechargeable battery 272. The solar panel 300 can be placed remotely by way of an extension cordage, one or more of the outlets can be pulled and provided in a remote location (e.g., another room or area) without having to move the power system 10. The solar panel 300 maximizes the life of the rechargeable battery 72 and the rechargeable battery 272. This is an improvement. This updated version is significantly more efficient.

The power system 10 further comprises a remote control 400. The remote control 400 is wirelessly connected with the electrical assembly 70, the air compressor system 140, the electrical system 270, and the solar panel 300. The remote control 400 has Wi-Fi control capability to the electrical assembly 70, the air compressor system 140, the electrical system 270, and the solar panel 300.

The power system 10 can power a house or car in case of a power outage. In the power system 10, the power sources need to be swapped in order to switch back and forth.

The power system 10 can vary in size to give power for different periods of time and how many devices one can plug into it.

In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A power system, comprising:
   a frame;

a main power base mounted on the frame;
a battery package removably mounted on the main power base and electrically coupled with the main power base, wherein the battery package may be charged by the main power base, and wherein the main power base and the battery package are two distinct circuits which function independently;
a flashlight removably mounted on the battery package and electrically coupled with the battery package;
a solar panel electrically coupled with the main power base and the battery package; and
a remote control wirelessly connected via Wi-Fi with the main power base, the battery package, and the solar panel;
wherein a retractable handle telescopically connects with and extends from the frame, and wheels rotatably connect with the frame;
wherein the main power base further comprises:
  a first top surface comprising a voltage meter, a cable booster port, a first screen, a first power button, a storage component for folding cables and a hinge door, wherein the hinge door covers the storage component;
  a first rear surface comprising a power input panel including a first 3-prong port, a first cigarette lighter port, a first power adapter port, a first hinge cover, and an air compressor adapter; and
  lateral surfaces comprising heat vents;
wherein the battery package further comprises:
  a front surface comprising a power output panel including a second 3-prong port(s), a second cigarette lighter ports, a second power adapter ports, a second hinge cover, a second screen, a second power button, and said flashlight, wherein the flashlight comprises high/medium/low brightness settings and is charged by said battery package and wherein the flashlight has an independent 4V circuit;
  a second top surface a cable booster port located; and
  a second rear surface comprising retractable multimeter prongs; and
wherein the solar panel supplies power to the main power base and the battery package at the same time using an inverter.

* * * * *